United States Patent [19]

Aoyagi et al.

[11] Patent Number: 4,551,966
[45] Date of Patent: Nov. 12, 1985

[54] APPARATUS FOR STORING INFORMATION STORAGE MEDIUMS INTO CASINGS

[75] Inventors: Shigeyuki Aoyagi, Yokohama; Mamoru Watanabe, Sagamihara, both of Japan

[73] Assignee: Victor Company of Japan, Limited, Japan

[21] Appl. No.: 386,788

[22] Filed: Jun. 8, 1982

[30] Foreign Application Priority Data

Jun. 10, 1981 [JP] Japan .................. 56-89367

[51] Int. Cl.⁴ .................. B65B 5/04; B65B 43/44
[52] U.S. Cl. .................. 53/571; 53/254; 53/381 A; 53/386
[58] Field of Search .......... 53/251, 254, 386, 571, 53/381 A; 271/131, 134; 414/121, 131, 96; 369/77.2

[56] References Cited

U.S. PATENT DOCUMENTS

| | | | |
|---|---|---|---|
| 1,724,657 | 8/1929 | Jahne | 271/134 |
| 2,350,666 | 6/1944 | Allen | 53/386 X |
| 2,361,960 | 11/1944 | Pelosi | 414/96 X |
| 2,601,785 | 7/1952 | Pottle | 271/134 X |
| 3,097,463 | 7/1963 | Neal | 271/134 X |
| 3,403,792 | 10/1968 | Cape | 414/96 |
| 3,490,195 | 1/1970 | Abramson | 53/572 X |
| 3,517,831 | 6/1970 | Hahn | 414/71 X |
| 3,553,929 | 1/1971 | Revicki | 414/96 X |
| 4,137,958 | 2/1979 | Golby | 53/386 X |
| 4,149,356 | 4/1979 | Palmer | 53/459 |
| 4,300,331 | 11/1981 | Yoshiba | 53/254 X |
| 4,360,845 | 11/1982 | Tajima | 369/77.2 X |
| 4,361,062 | 11/1982 | Reiff | 414/121 |
| 4,365,458 | 12/1982 | Palmer | 53/573 X |
| 4,367,546 | 1/1983 | Shibata | 369/271 |
| 4,387,454 | 6/1983 | Yamamura | 369/270 |

FOREIGN PATENT DOCUMENTS 1283522 7/1972 United Kingdom .................. 53/571

Primary Examiner—John Sipos
Attorney, Agent, or Firm—Lowe, King, Price & Becker

[57] ABSTRACT

Information storage mediums such as video discs are picked up by a pickup device and transferred one at a time to a storage position in which the video disc is placed on a disc rest. Casings stocked in a stocker are pushed one at a time by a casing pusher to the storage position. The casing is supported by a casing holder mechanism, retracted away from the storage position to allow the disc to be supported on the rest, and then displaced toward the storage position to let the disc be inserted into the casing supported on the holder mechanism. A completed assembly of the disc and casing is temporarily stocked, and a predetermined number of such stocked assemblies are discharged onto a discharge conveyor.

20 Claims, 20 Drawing Figures

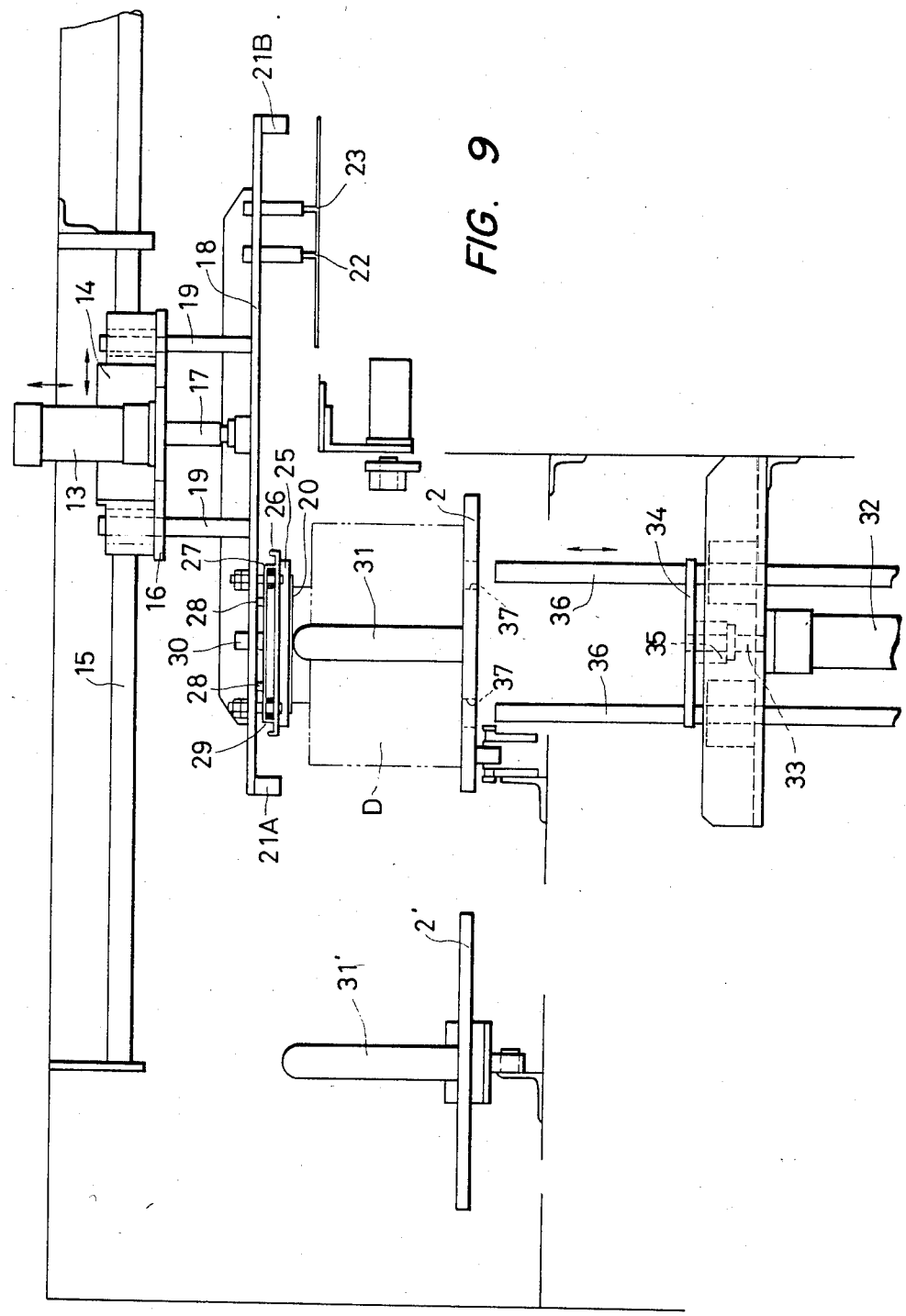

APPARATUS FOR STORING INFORMATION STORAGE MEDIUMS INTO CASINGS

BACKGROUND OF THE INVENTION

The present invention relates to an apparatus for storing information storage mediums, such as video discs into casings.

Video discs containing both video and audio information at a high density are in the form of a flat circular plate made of vinyl chloride which is rendered electrically conductive by being mixed with 5% to 30% by weight of carbon. The video disc has on each of its surfaces a spiral track containing a series of depressions or pits written by frequency-modulated signals, with adjacent track convolutions or turns being closely spaced at a pitch of 1.35 $\mu$m. The information can be read out of the spiral track by picking up variations in electrostatic capacity produced between the pits and a diamond pickup needle having a metal film electrode which traces the spiral track as the disc rotates at a high speed.

When the video disc is smeared with dust or oily finger dirt, reproduced signals picked up from such video disc are adversely affected by such deposits on the video disc. To protect video discs against deposition of dust or foreign matter and possible damage, the video discs are normally stored in protective casings so that the operator cannot touch the video discs under normal usage such as when loading the video disc into a video disc player.

Protective disc casings are composed of a sleeve for containing a video disc and a lid plate inserted in the sleeve to retain the video disc therein. For reproduction of the video disc, the casing is inserted through a slot into a video disc player until the casing reaches a pickup positon therein, and the sleeve is pulled out to leave the lid plate and the video disc in the video disc player. Loading the video disc into the video disc player without any chance of the disc surface getting touched by an operator's fingers is highly desirable, to keep the best quality of video discs as they are pressed in view of rough usage expected of video discs which are supposed to find more users than ordinary audio discs. With video discs being capable of being loaded into video disc players through their front panel, the video disc player can have all of its control switches and pushbuttons on the front panel for ready access by the operator. The video disc players can be designed such that they can be mounted on a rack or other objects may be put on the players. Therefore, the video disc players can have more leeway in the availability of different designs and can be rendered more practical in usage.

SUMMARY OF THE INVENTION

It is an object of the present invention to provide an apparatus for automatically storing information storage mediums such as video discs into casings.

Another object of the present invention is to provide an apparatus for storing information storage mediums such as video discs into casings at an increased rate without causing damages to the mediums.

According to the present invention, information storage mediums such as video discs are picked up one at a time from a pallet by a pickup device including a pair of suckers supported on a plate mounted on a slide movable along a pair of guide rails. When the slide is moved along the guide rails, the picked-up video disc is transferred away from the pallet toward a storage position. A stack of disc casings is stocked in a stocker having an open lower end, and one of the disc casings is pushed at a time by a casing pusher toward the storage position. The casing pusher includes a movable frame, a pusher finger mounted on the movable frame, and a fluid cylinder for moving the movable frame to cause the pusher finger to displace the lowermost one of the casings from the open lower end of the stocker. The lowermost casing to be pushed out of the stocker is released by rubber grippers of the load which would otherwise be imposed by other casings above such lowermost casing, so that the latter can be smoothly be pushed out of the stocker. The casing as it is displaced to the storage position is supported by a holder mechanism which is movable from the storage position to a retracted position. The casing is sandwiched between a pair of suckers respectively on a pair of pivotable arms of the holder mechanism. A lid plate is removed by a lid plate remover from a sleeve of the casing. When the suckers are actuated, upper and lower surfaces of the sleeve are attracted thereby opening a disc insertion slot of the sleeve for easy insertion of the video disc therethrough. While the holder mechanism as it supports the sleeve is being retracted away from the storage position, the video disc is brought into the storage position in which the video disc is placed on a disc rest. Then, the holder mechanism is advanced toward the storage position during which the video disc is inserted into the sleeve through the disc insertion slot. When the video disc is fully placed into the sleeve, the lid plate is inserted again into the sleeve, thereby completing an assembly of the casing and the video disc contained therein. Such a completed assembly is delivered to a temporary stocker mechanism, and when a predetermined number of such completed assemblies are stacked in the temporary stocker mechanism they are discharged by a pusher plate onto a discharge conveyor.

BRIEF DESCRIPTION OF THE DRAWINGS

The present invention will be described in detail by way of an illustrative example with reference to the drawings in which;

FIG. 9 is an enlarged transverse cross-sectional view of the apparatus, showing a disc transfer device;

DETAILED DESCRIPTION OF THE INVENTION

Figure 1:
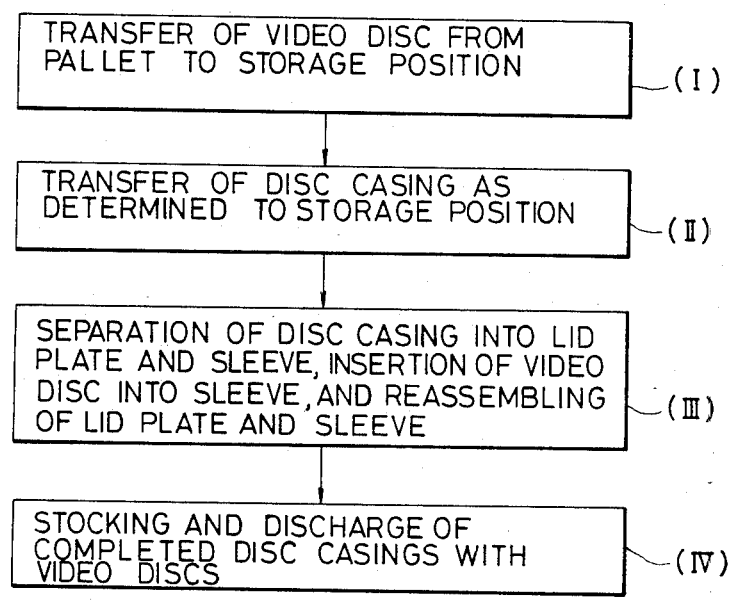
FIG. 1 is a flowchart showing progressive processes of storing an information storage medium such as a video disc in a casing.

An apparatus for storing information storage mediums such as for example, video discs into disc casings, according to the present invention, effects four processes (I) through (IV) as shown in FIG. 1. In the first process (I), a video disc placed on a pallet is picked up under suction in preparation for transfer into a storage position in which the video disc is to be stored into a disc casing. The second process (II) includes the steps of determining the kind of a disc casing and upper or lower surface thereof, and then transferring the disc casing to the storage position. The third process (III) comprises the steps of separating the disc casing as fed to the storage position into a lid plate and a sleeve, transferring the casing members respectively to certain positions, then transferring the video disc to the storage position, retrieving the sleeve, storing the video disc into the sleeve, and thereafter rejoining the lid plate to the sleeve with the video disc contained therein. According to the fourth process (IV), the disc casing with the video disc stored therein is temporarily stocked in a temporary stocker mechanism, and a predetermined number of such disc casings as stocked in the temporary stocker mechanism are discharged onto a discharge conveyor.

Figure 2:
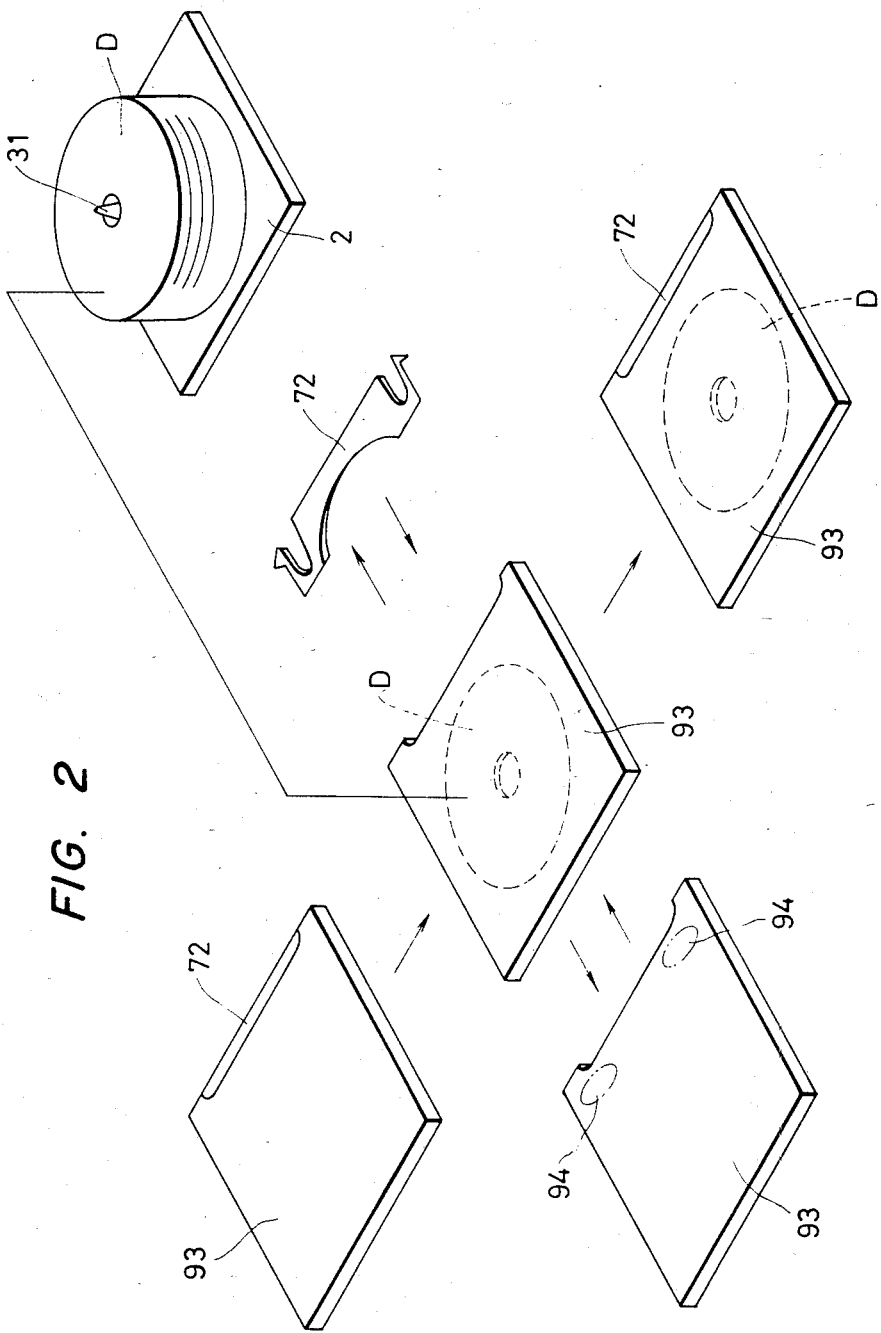
FIGS. 2 through 5 are schematic perspective views illustrative of a variety of processes of storing information storage mediums in casings.
Figure 3:
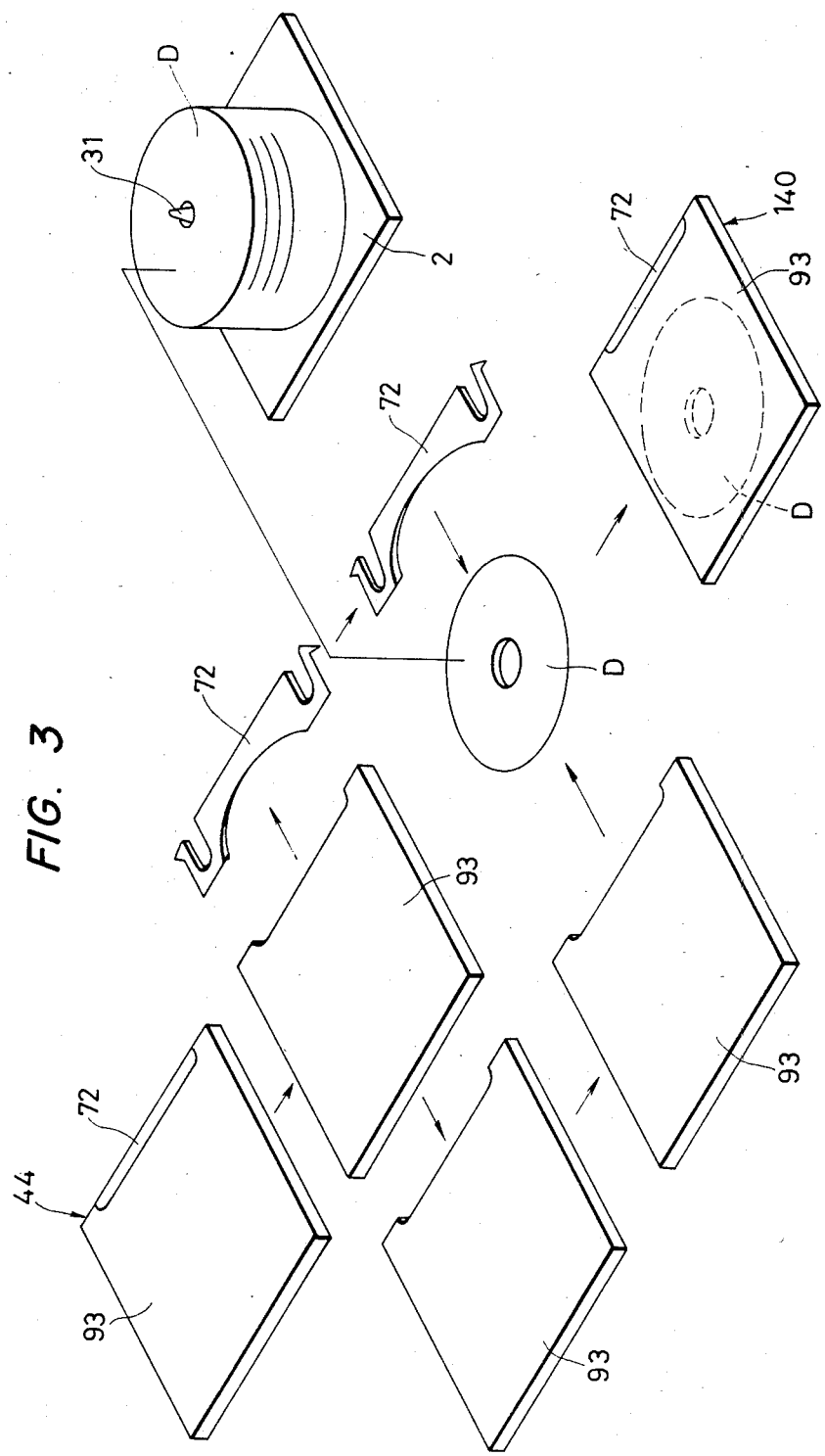
Figure 4:
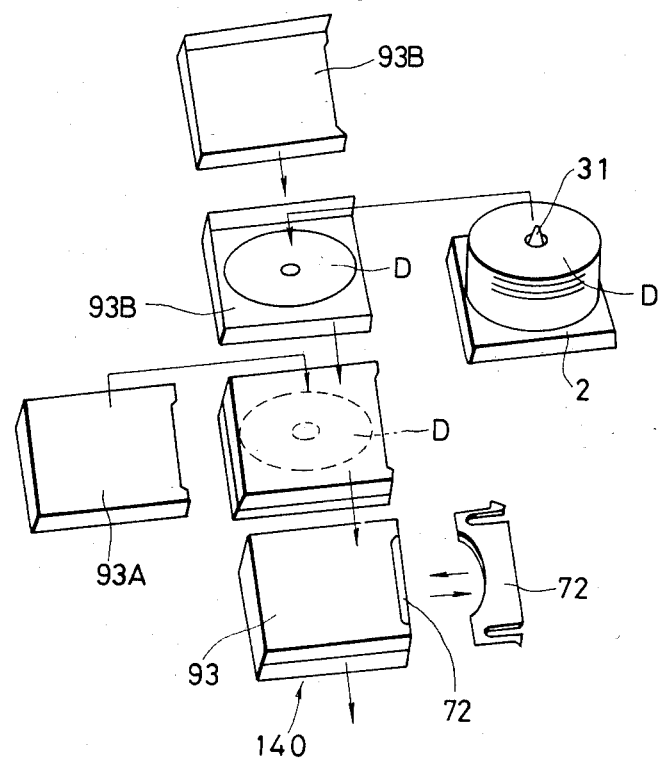
Figure 5:
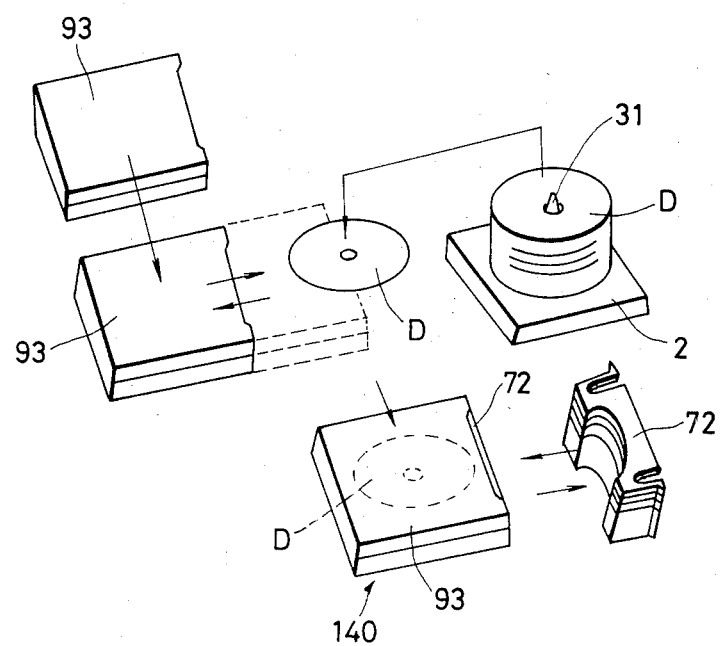

FIG. 2 is illustrative of such a process of storing an information storage medium or video disc into a disc casing. FIGS. 3-5 are illustrative of various other processes to achieve similar results.

Figure 6:
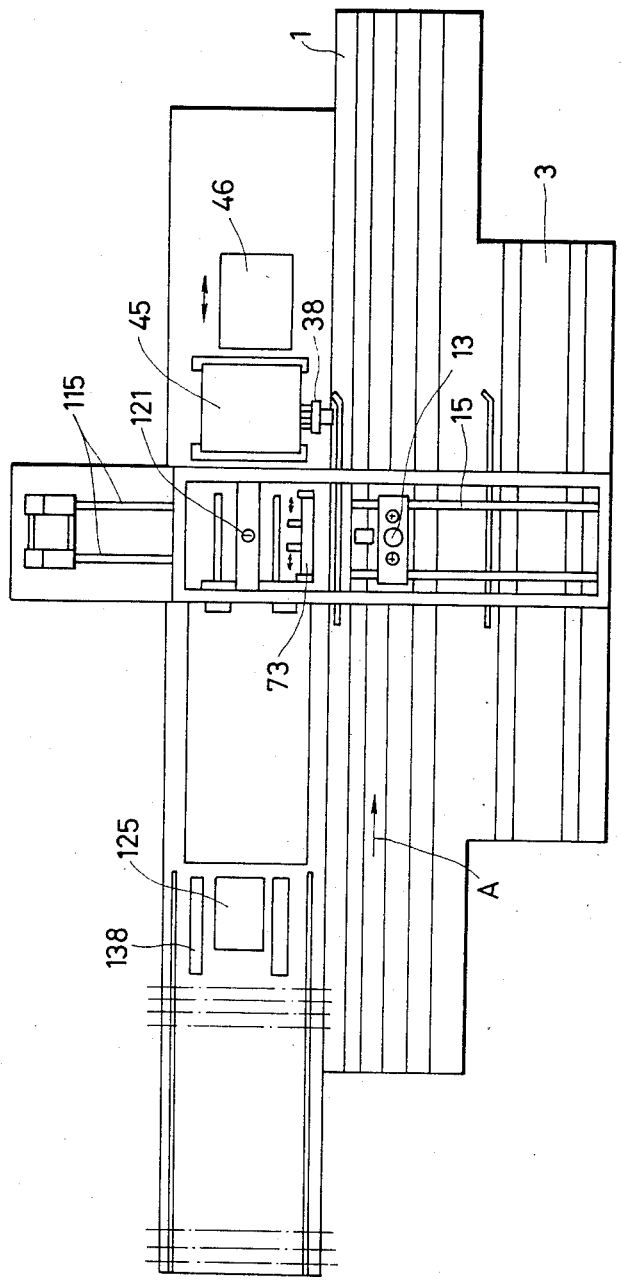
FIG. 6 is a plan view of an apparatus for storing information storage mediums in casings.
Figure 7:
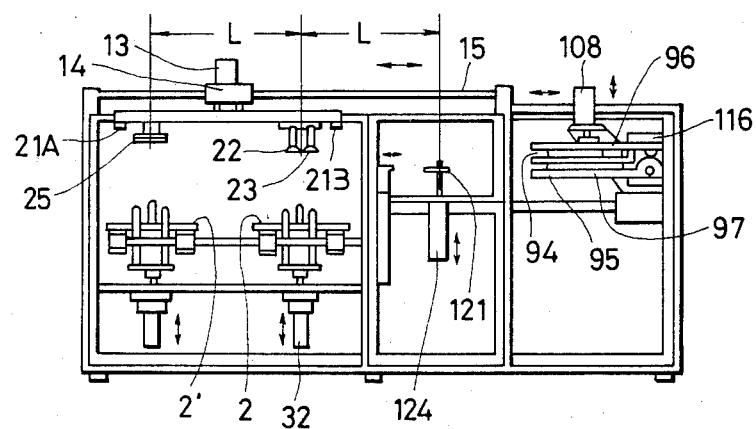
FIG. 7 is a side elevational view of the apparatus shown in FIG. 6.

As shown in FIGS. 6 and 7, the storing apparatus of the invention includes a disc pallet conveyor 1 for feeding in the direction of the arrow A (FIG. 6) a pallet 2 which carries thereon a plurality of video discs that have been shaped to desired contour by a press machine. Partitions of magnetic material are interleaved between certain video discs, and a pair of such partitions are positioned on and below the stack of the video discs carried on the pallet 2. The magnetic partitions can be picked up by a magnet when they are to be removed away from the video discs. The partitions may however be of nonmagnetic material. The nonmagnetic partitions can be picked up by a sucker which operates under suction.

The storing apparatus of the invention also has an empty pallet conveyor 3 disposed parallel to the disc pallet conveyor 1 for feeding a pallet 2', which will carry a predetermined number of partitions. A beam of light is emitted from a suitable light source such as a phototube along a path over the pallet 2'. When such a beam of light is broken by the partitions deposited on the pallet 2', the pallet 2' is actuated and starts being lowered for a certain distance. Downward movement of the pallet 2' actuates a switch (not shown) in abutment against the pallet 2', whereupon the pallet 2' is released and allowed to be fed on and along the conveyor 3.

Figure 8:
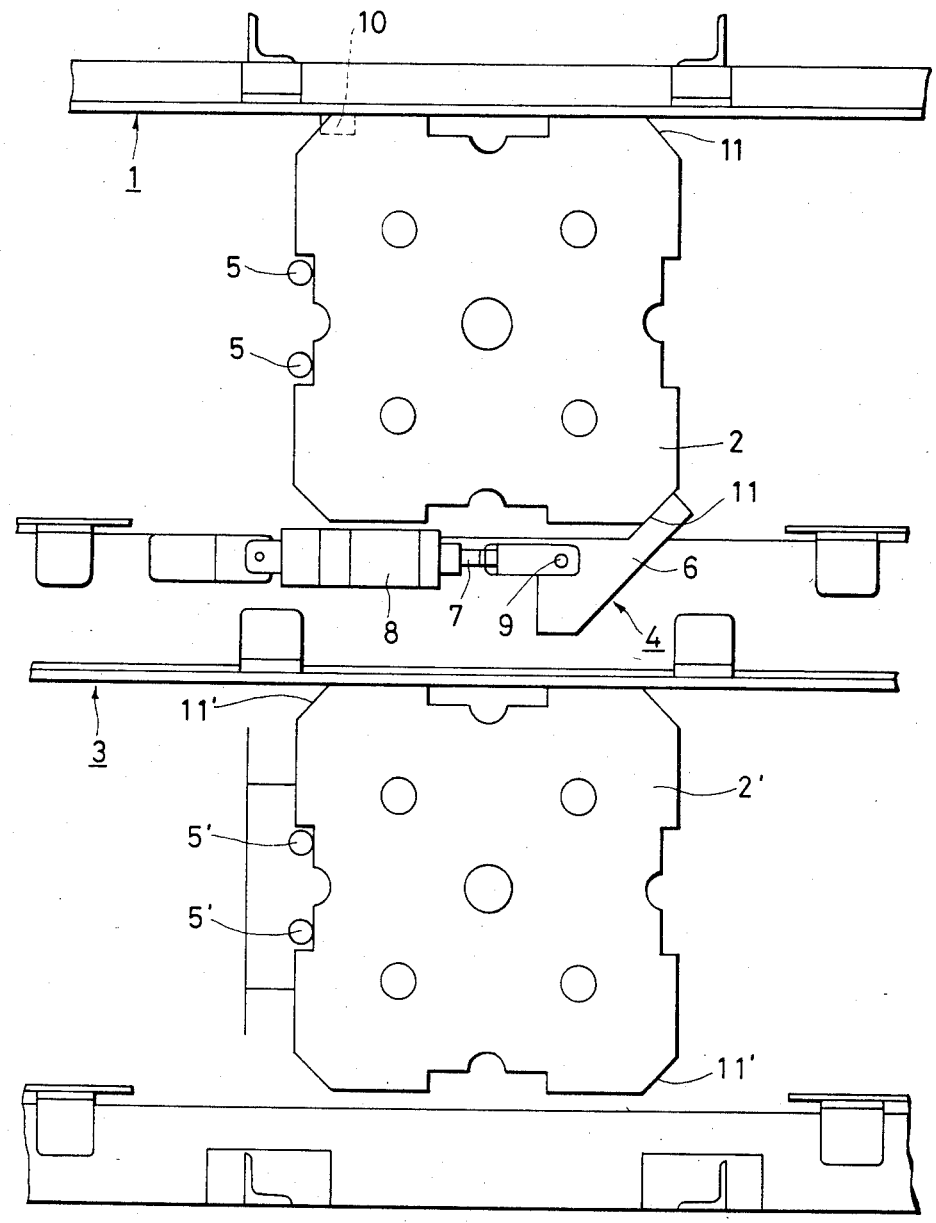
FIG. 8 is an enlarged plan view of pallets as supported on conveyors in the apparatus of FIGS. 6 and 7.

As illustrated in FIG. 8, the disc pallet conveyor 1 has an inlet stopper 4, which comprises a bent positioning arm 6 pivotably mounted by a pin 9 on a connector head 7 of a fluid-pressure actuator 8 such as a pneumatic cylinder mounted on a base of the disc pallet conveyor 1. The bent positioning arm 6 is normally biased to turn clockwise (FIG. 8) about the pin 9 under the resiliency of a suitable resilient means (not shown). Although not shown, the empty pallet conveyor 3 also has an inlet stopper which is identical in construction to the inlet stopper 4, and located in lateral alignment therewith. The disc pallet conveyor 1 and the empty pallet conveyor 3 also have outlet stoppers 5, 5 and 5', 5', respectively, normally projecting upwardly in the paths of movement of the pallets 2, 2', respectively. A limit switch 10 attached to the disc pallet conveyor 1 is actuatable by the pallet 2 as pallet 2 is by the disc pallet conveyor 1, to operate the cylinder 8.

When the pallet 2 with a certain number of video discs carried thereon is conveyed on the conveyor 1 into abutment against the outlet stoppers 5, 5, the limit switch 10 is actuated by the pallet 2 to operate the cylinder 8. Actuation of the cylinder 8 causes the connector head 7 to turn the positioning arm 6 counterclockwise against the bias of the resilient means until the positioning arm 6 is brought into contact with a bevelled corner 11 of the pallet 2, whereupon the latter is positioned in place.

Although not shown, a light source such as a phototube emits a beam of light which travels over and across the pallet 2 as thus positioned. As long as the pallet 2 carries thereon video discs and partitions, such a light beam is broken thereby and fails to reach a photodetector (not shown). When all of the video discs and partitions are removed from the pallet 2, the photodetector is energized by the light beam arriving from the phototube, actuating the outlet stoppers 5, 5 which are then lowered to release the pallet 2. The released pallet 2 is now returned to a loading position in which another set of video discs and partitions is placed on the pallet 2. The pallet 2', on which only partitions are deposited, will not go along with the empty pallet 2 to such a loading position.

FIG. 9 illustrates a disc transfer device for selecting video discs and partitions on the pallet 2 placed on and conveyed by the disc pallet conveyor 1, and for transferring the video discs one at a time to a storage position in which they are put into disc casings and transferring the partitions onto the pallet 2'. The disc transfer device includes a pneumatic cylinder 13, a slide 14 supporting the pneumatic cylinder 13 and slidable on and along a pair of guide rails 15 (FIG. 9), and a plate 16 affixed to the slide 14 and disposed therebelow. The pneumatic cylinder 13 has a piston rod (not shown) to which there is attached a shaft 17 secured to a horizontal plate 18. Actuation of the pneumatic cylinder 13 moves the horizontal plate 18 upwardly or downwardly. Such vertical movement of the horizontal plate 18 is guided by a pair of guide bars 19, 19 attached to the horizontal plate 18 and extending slidably through the slide 14. The horizontal plate 18 supports a pair of sensors 21A, 21B on its lower surface for determining whether there is any disc or partition on the pallet 2.

Figure 10:
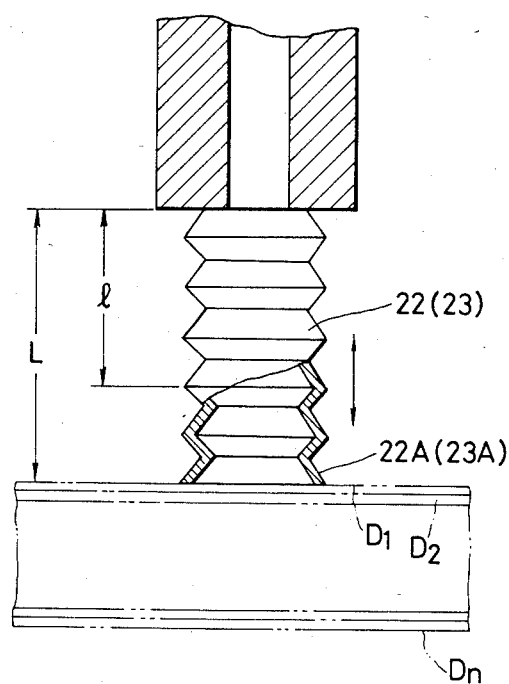
FIG. 10 is an enlarged side elevational view, partly in cross section, of a sucker for picking up a video disc and a partition.

The plate 18 also supports thereon a pair of disc pickup devices 22, 23 each having a sucker 22A, 23A on its lower end, as illustrated in FIG. 10. The pickup device 22, 23 is in the form of bellows which is vertically contractable or extensible and has a length L larger than the length that the bellows will have when compressed upon picking up of one video disc.

An electromagnet 25 is mounted on the horizontal plate 18 and disposed therebelow. The electromagnet 25 is generally spaced horizontally from the pickup devices 22, 23 by a distance which is equal to that between the centers of the pallets 2, 2'. More specifically, the electromagnet 25 is fixed to an attachment 26 secured to a support 27 which is connected by support rods 28 to the horizontal plate 18. A pair of springs 29, 29 are disposed between the support 27 and the attachment 26 for normally biasing the electromagnet 25 downwardly. The support 27 supports thereon a small-size pneumatic cylinder 30.

The pallet 2 has a central vertical rod 31 for retaining video discs D. Each of the video discs D has a central hole through which the central vertical rod 31 extends when they are placed on the pallet 2. The disc transfer device also includes a vertical cylinder actuator 32 having a piston rod coupled to a connector 33 which is connected to a support 35 on which a pusher base 34 is fixedly mounted. A pair of vertical disc pushers 36, 36 is secured to the pusher base 34 and extends in alignment with holes 37, 37, respectively, defined in the pallet 2. When the cylinder actuator 32 is in operation, the disc pushers 36, 36 are pushed upwardly to raise the stack of video discs D carried on the pallet 2. In operation, an uppermost one of the video discs D which are lifted by the disc pushers 36, 36 is picked up by the disc pickup devices 22, 23, and then the slide 14 is slid on and along the guide rails 15 to the left (FIG. 4) until the picked-up video disc is brought to the storage position. FIG. 9 shows the position of the parts in which a picked-up video disc has reached such storage position.

The distance between the center of the pallets 2, 2' placed on the conveyors 1, 3 is equal to the distance between the center of the pallet 2 and the center of a disc receiver 121 (described later on). Likewise, the center of the attachment 26 is spaced from the center between the disc pickup devices 22, 23 by a distance which is equal to the distance between the center between the disc pickup devices 22, 23 and the center of the disc receiver 121.

Figure 11:
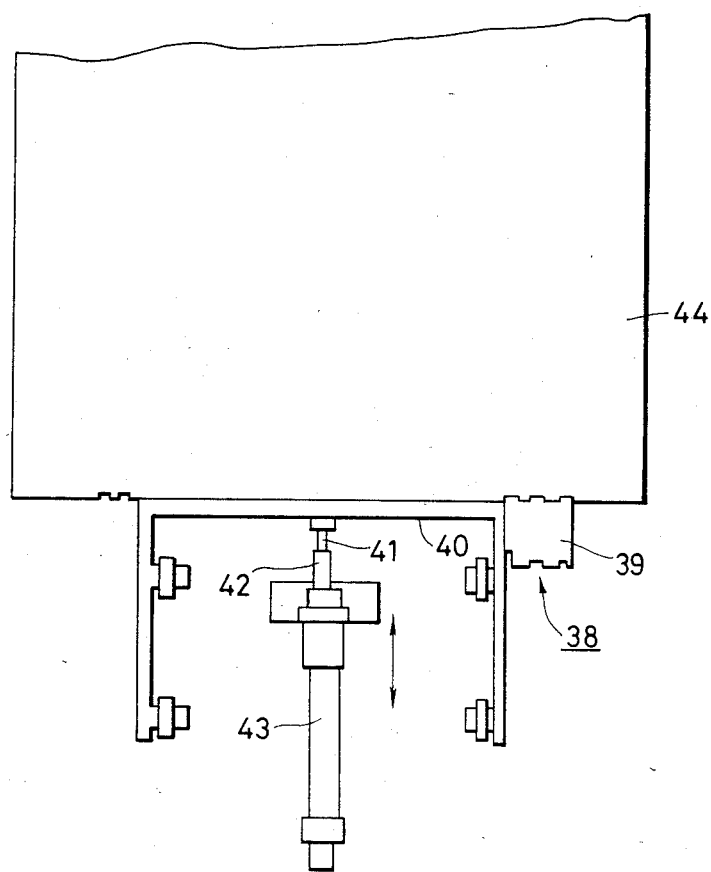
FIG. 11 is a plan view of a sensor for determining the kind of a disc casing and the upper or lower surface of the disc casing.

FIG. 11 shows a sensor unit 38 which is engageable in slots in a lid plate (described later on) to determine the kind of a disc casing and the upper or lower surface thereof. The sensor unit 38 is composed of a limit switch 39 serving as a sensor, a flange 40 mounting the limit switch 39 thereon, and a cylinder actuator 43 having a piston 42 coupled by a connector 41 to the flange 40. The lid plate with which the sensor unit 38 can coact is normally placed in a disc casing 44 in which a single video disc D is to be stored. A predetermined number of such disc casings 44 are stocked in a stocker, which will be described below.

Figure 12:
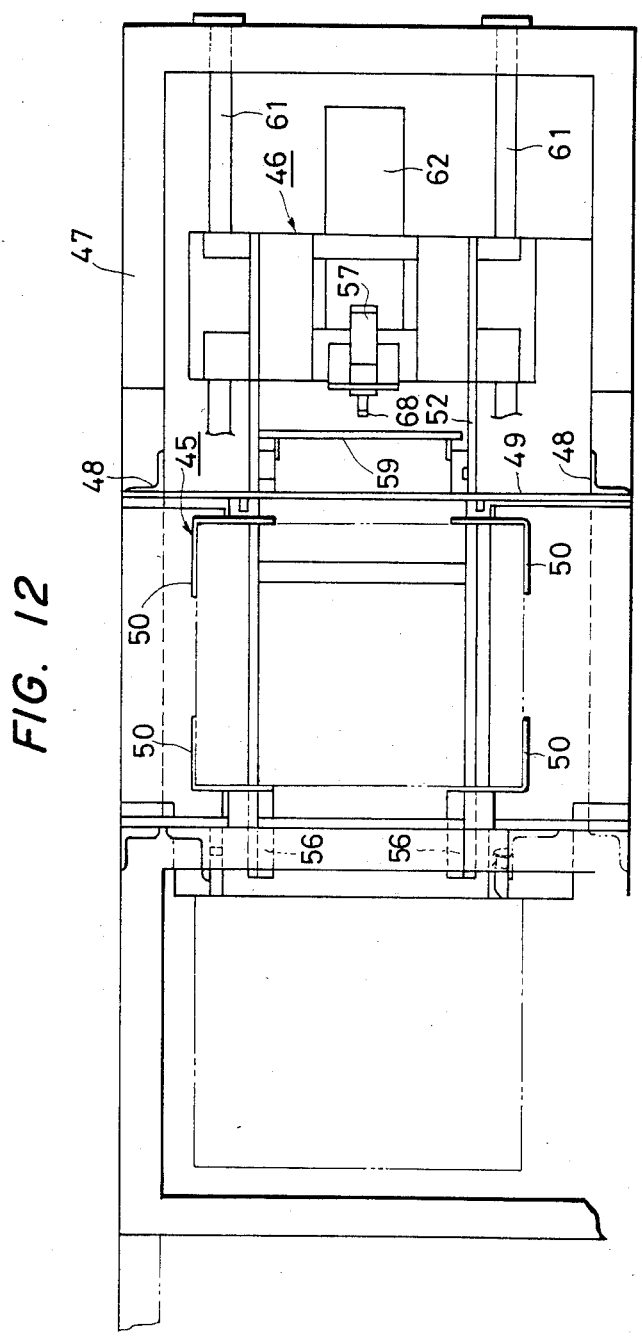
FIG. 12 is a plan view of a stocker for stocking disc casings and a casing pusher for displacing the disc casings as stocked in the stocker.
Figure 13:
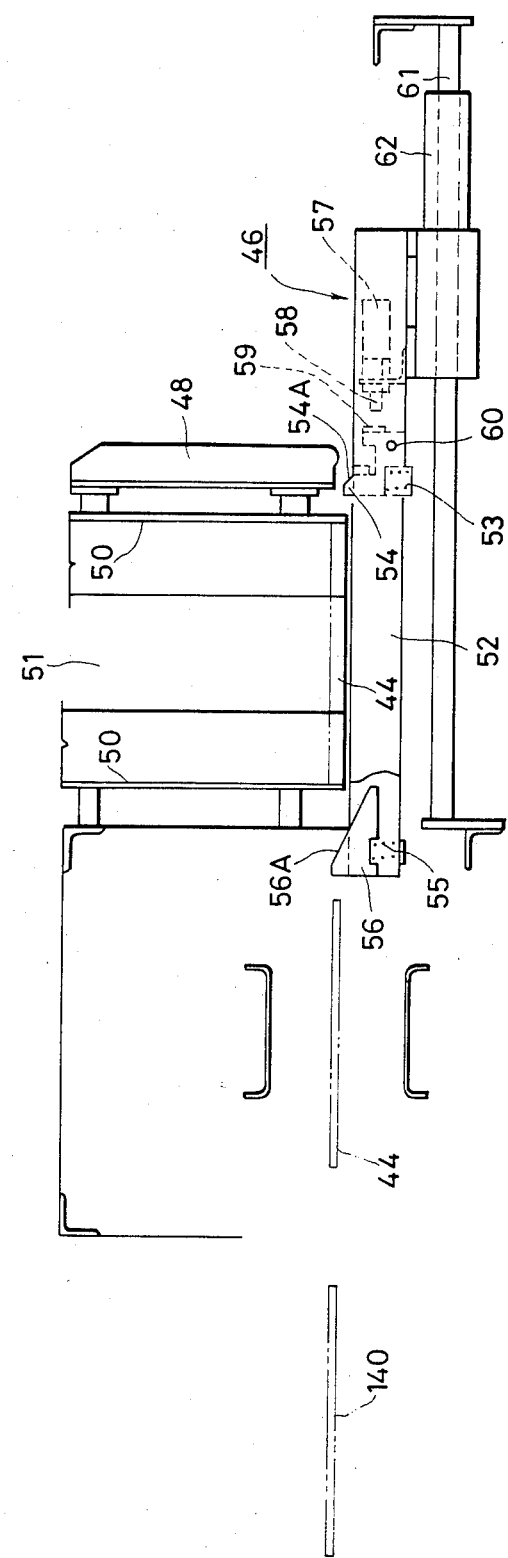
FIG. 13 is a side elevational view of the stocker and the casing pusher shown in FIG. 12.

As shown in FIGS. 12 and 13, a stocker 45 comprises four L-shaped frame members 50 mounted on a frame 47 through angles 48 and attachments 49, the L-shaped frame members 50 jointly defining a square-shaped container with upper and lower ends being open. The disc casings 44 as stacked are stocked in the stocker 45. A casing pusher 46 is positioned sideways of the casing stocker 45 for pushing one of the disc casings 44 at a time out of the stocker 45 toward a predetermined position. The casing pusher 46 includes a movable frame 52 having single-casing pusher fingers 54 normally urged by springs 53 to move upwardly and located adjacent to the stocker 45 for feeding one disc casing 44 toward the predetermined position, and other pusher fingers 56 normally urged by springs 55 to move upwardly and located at a distal end of the frame 52 for feeding the disc casing 44 from the predetermined position toward another position.

The casing pusher 46 has a small-size cylinder actuator 57 which is actuatable when the sensor 38 determines that a disc casing 44 engaging the limit switch 39 is not a desired one, for preventing such an undesirable disc casing 44 from being pushed toward the storage position. More specifically, when the disc casing 44 is determined as being a proper one, the cylinder 57 is actuated to cause its piston 58 to push the attachment 59 until the pusher fingers 54 are angularly moved counterclockwise (FIG. 12) about pins 60 into the movable frame 52. The pusher fingers 54 then act to prevent such improper disc casing 44 from going toward the storage position. The casing pusher 46 is movable on and along a pair of guide rails or rods 61, 61 toward a position below the stocker 45 when a cylinder actuator 62 is operated in response to supply of a predetermined signal. When the casing pusher 46 is thus actuated, one of the disc casings 44 at a time can be discharged from the stocker 45 toward the storage position. The pusher fingers 54, 56 have upper slanted edges 54A, 56A, respectively, which are slidably engageable with the stocker frame members and other parts to push down the pusher fingers 54, 56 when the casing pusher 46 is retracted to the left as shown in FIG. 13.

Figure 14:
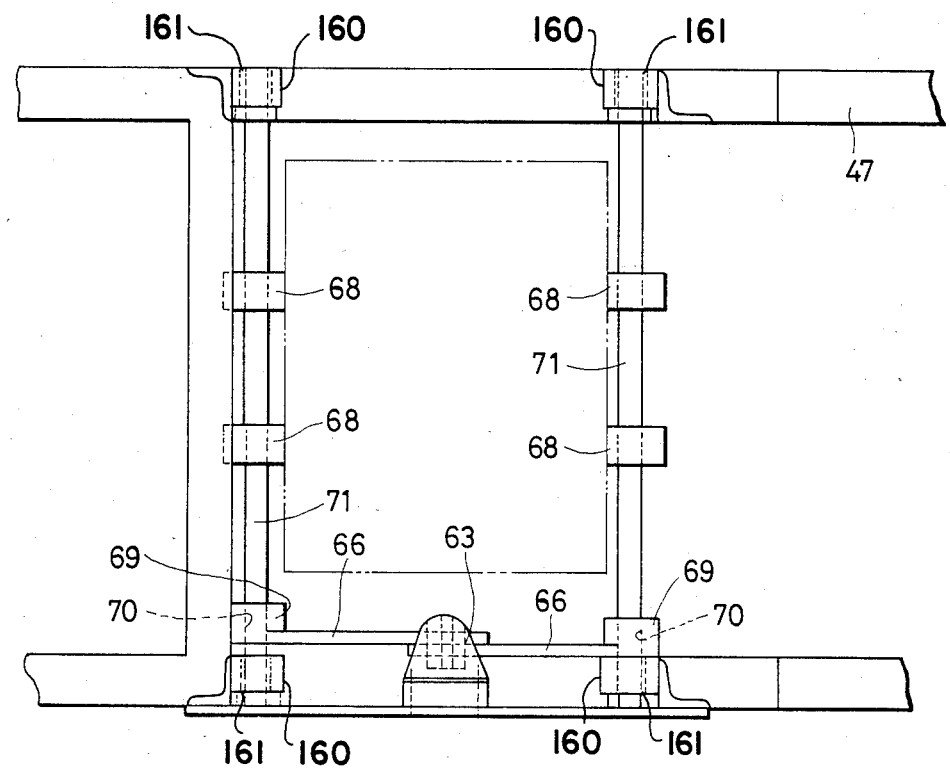
FIG. 14 is a plan view of a clamp mechanism for clamping several casings stocked in the stocker to prevent a lowermost casing from being subjected to an undue load due to stacked casings.
Figure 15:
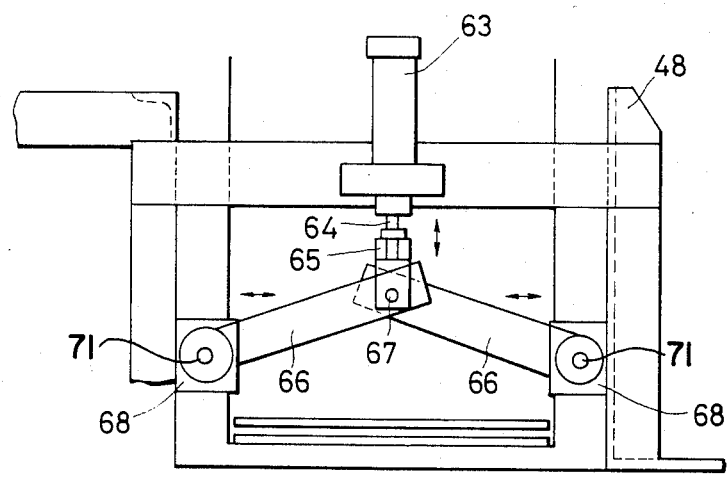
FIG. 15 is a side elevational view of the clamp mechanism illustrated in FIG. 14.

FIGS. 14 and 15 are illustrative of a clamp mechanism installed in the stocker 45 shown in FIGS. 12 and 13 for preventing a lowermost one of the disc casings stored in the stocker 45 from undergoing an undue load of the stacked disc casings 44 in the stocker 45. More specifically, the clamp mechanism includes a vertical cylinder actuator 63 having a piston rod 64 coupled to a connector 65 on which a pair of toggle arms 66, 66 is pivotably mounted by a pivot pin 67. The toggle arms 66, 66 have in their distal ends 69 holes 70 through which extend a pair of rods 71, 71 supporting a plurality of rubber grippers 68 secured thereto. As is shown most clearly in FIG. 15, rods 71 fit only loosely in apertures 161 in bushings 160 attached to the vertical members 48. The looseness of fit between rods 71 and apertures 161 allows a small in and out traverse of rods 71, with rubber grippers 68 mounted thereon, to selectively drop the lowest one a number of disc casings supported therebetween. This action is complemented by the resiliency of the rubber of which grippers 68 are made. When cylinder 63 causes pin 67 to move downward, then rubber grippers 68, on rods 71, move apart and allow the lowermost one of the casings to drop therebetween. The rubber grippers 68 normally grip therebetween several of disc casings 44 above a lowermost disc casing so that the latter is free from any excessive pressure or load which would otherwise be imposed by the weight of the casings 44 stacked thereon. Thus, the lowermost disc casing can easily be fed out of the stocker 45 by the casing pusher 46. The cylinder 63 is actuated in response to operation of a switch (not shown) when the cylinder 43 (FIG. 11) is retracted after the sensor 38 has determined the type of a disc casing 44 and its upper or lower surface. Actuation of the cylinder 63 causes the piston rod 64 to project, whereupon the toggle arms 66, 66 forces the rubber grippers 68, 68 to be displaced laterally outwardly on the rods 71, 71, allowing a few of disc casings 44 to drop down out of engagement with the rubber grippers 68, 68. Therefore, the lowermost disc of casing 44 is placed under a suitable load for subsequent delivery out of the stocker 45 in response to operation of the casing pusher 46. When the casing pusher 46 actuates a limit switch (not shown) on the returning stroke, the cylinder 63 is actuated thereby to move upwardly and downwardly to displace the rubber grippers 68, 68 laterally for successively lowering disc casings 44 while being gripped by the grippers 68, 68 to lower positions.

Figure 16:
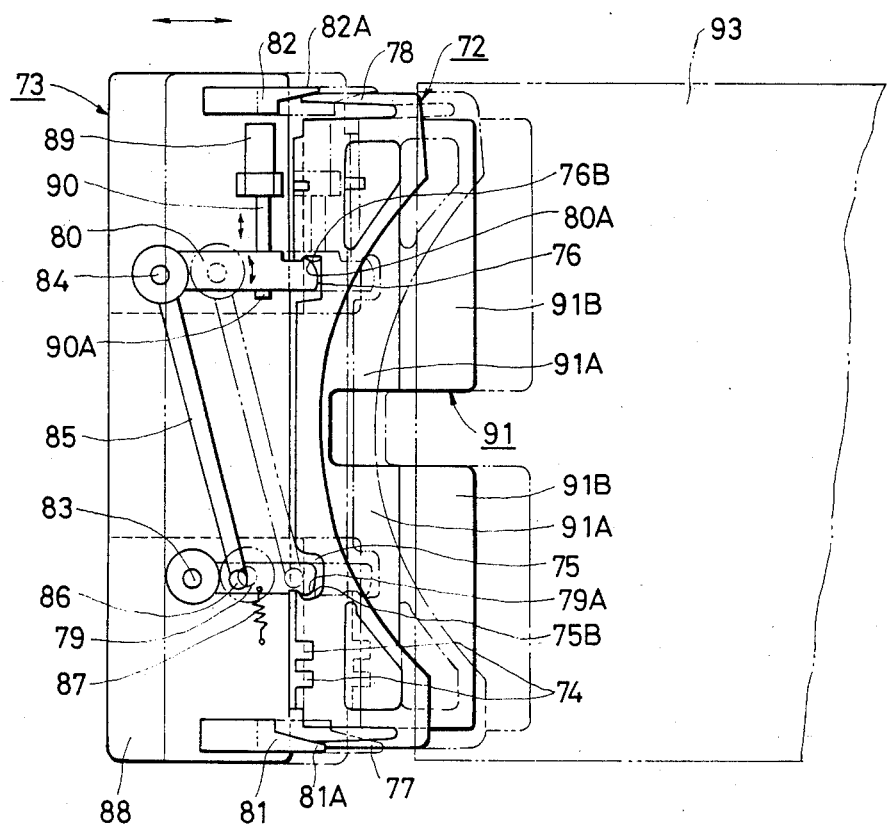
FIG. 16 is a plan view of a remover mechanism for removing a lid plate from a disc casing.
Figure 17:
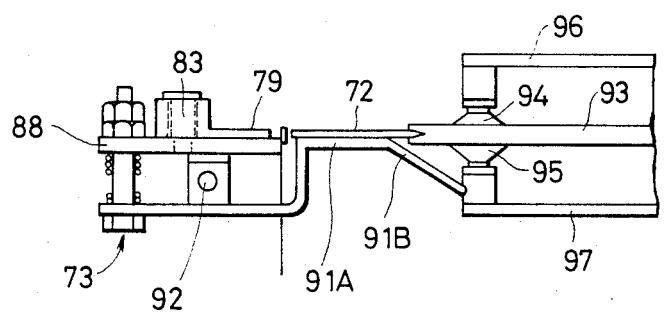
FIG. 17 is a side elevational view of the remover mechanism shown in FIG. 16.

FIGS. 16 and 17 illustrate a remover mechanism including a lid plate remover 73 for removing a lid plate 72 from a disc casing sleeve 93 as it has been delivered by the casing pusher 46 to the storage position in which a video disc D is to be inserted into the disc casing 4.

The lid plate 72 has in one edge thereof a pair of slots 74, 74, one for determining whether a video disc D, for example, has its face or back up, and the other for determining whether a disc contained in the disc casing 44 is a video disc or an audio digital disc. One of the slots 74 may otherwise serve to determine whether a stored disc has stereophonic recorded information or multiplex recorded information, or whether a stored disc is for PAL or NTSC. The lid plate 72 is normally placed in the sleeve 93, the lid plate 72 and the sleeve 93 jointly constituting the disc casing 4. The lid plate 72 includes a pair of lateral locking arms 77, 78 which, when the lid plate 72 is inserted in the sleeve 93, is resiliently pressed against opposite folded sidewalls of the sleeve 93 to retain the lid plate 72 and hence the disc securely in the sleeve 93 against accidental removal.

The lid plate remover 83 generally has a pair of hook arms 79, 80 insertable respectively into a pair of relatively large recesses 75, 76 defined in the edge of the lid plate 72 to hook the lid plate 72, and a pair of relatively lare recesses 75, 76 defined in the edge of the lid plate 72 to hook the lid plate 72, and a pair of lateral presser arms 81, 82 for forcibly pressing the locking arms 77, 78, respectively, of the lid plate 72 toward each other out of engagement with the disc casing 93 when the hook arms 79, 80 are inserted into the recesses 75, 76 for thereby allowing easy removal of the lid plate 72 out of the disc casing 93. The presser arms 81, 82 are each in the form of a flat plate and have tapered distal ends 81A, 82A, respectively, for smoothly displacing the locking arms 77, 78 upon sliding engagement therewith. The hook arms 79, 80 have locking projections 79A, 80A, respectively. The locking projections 79A, 80A are movable lockingly into cavities 75B, 76B, respectively, of the recesses 75, 76 when a plate 88 of the lid plate remover 73 is displaced toward the lid plate 72 by a cylinder actuator (not shown) disposed beneath the plate 88. The plate 88 supports thereon a pair of shafts 83, 84 which project upwardly through the hook arms 79, 80, respectively. The hook arms 79, 80 are thus pivotably movable on and about the shafts 83, 84. The hook arm 80 is pivotably coupled by a connector bar 85 to a pivot pin 86 secured to the hook arm 79, so that the hook arms 79, 80 are angularly movable away from each other as described later on. A compression coil spring 87 acts between the plate 88 and the hook arm 79 for normally urging the hook arm 79 and hence the hook arm 80 to turn counterclockwise as shown in FIG. 16.

A cylinder actuator 89 is mounted on the plate 88 and has a connector rod 90 coupled to its piston rod and having a distal end 90A held in operative engagement with the hook arm 80. The lid plate remover 73 includes a lid plate guide 91 projecting from below the plate 88 toward the sleeve 93. The lid plate guide 91 has a pair of flat portions 91A, 91A and a pair of downwardly bent fins 91B, 91B extending therefrom, respectively. The flat portions 91A, 91A and the downwardly bent fins 91B, 91B serve to guide the lid plate 72 to move therealong against vertical displacement while the lid plate 72 is being pulled out of the sleeve 93. Although not shown, an alternative guide for the lid plate 72 may comprise upper rollers supported on the plate 88 and lower rollers supported on a frame (not shown), the upper and lower rollers serving to hold the lid plate 72 therebetween as it emerges from the sleeve 93. The lid plate guide 91 is connected to the plate 88 by a connector 92 disposed therebetween. A pair of upper and lower suckers 94, 95 are supported respectively on a pair of pivotable arms 96, 97 on their distal ends for sandwiching the sleeve 93 therebetween. The suckers 94, 95 upon being actuated are attached to upper and lower faces of the sleeve 93, and are moved away from each other to spread a disc insertion slot 93A (FIG. 18) of the sleeve 93 when the pivotable arms 96, 97 are angularly moved upwardly and downwardly, respectively. As an alternative, the disc insertion slot of the sleeve 93 may be enlarged by a pair of upper and lower hooked members engageable with the upper and lower faces of the sleeve 93.

Figure 18:
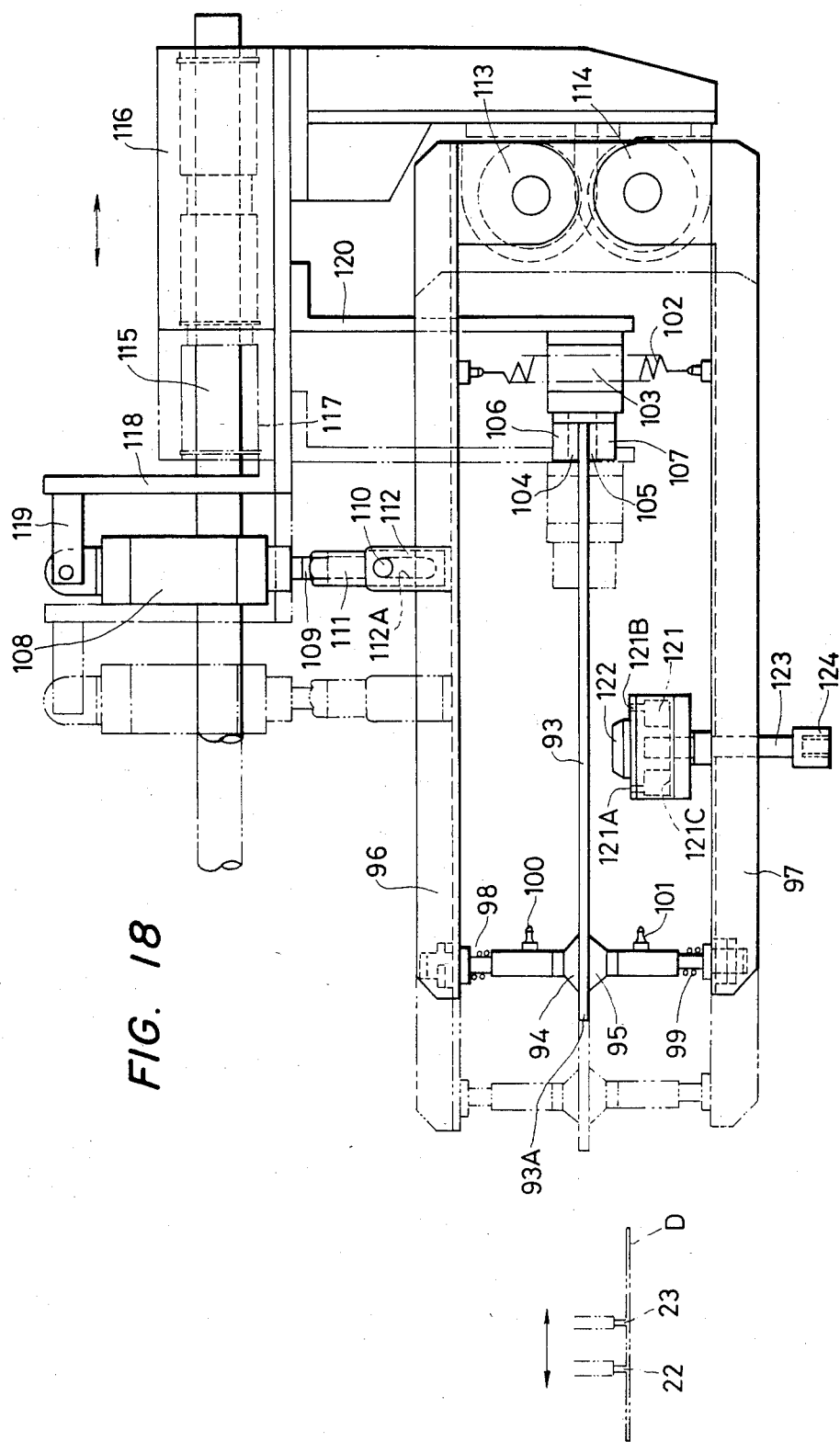
FIG. 18 is a side elevational view of a holder mechanism for holding the sleeve of a disc casing.

A holder mechanism as shown in FIG. 18 for holding the sleeve 93 of the disc casing 44 includes the pair of pivotable arms 97, 98 as illustrated in FIG. 17. As shown in FIG. 18, the disc insertion slot 93A of the sleeve 93 can be spread by the upper and lower suckers 94, 95 with a rear end of the sleeve 93 being held in place as described below. The pivotable arms 96, 97 are pivotably supported by a slide 116 slidable on a pair of guide rails 115 (FIG. 6). The pivotable arms 96, 97 are shown by the solid lines as having been retracted by the slide 116 actuated by a suitable driver to displace the sleeve 93 back to a retracted position. The arms 96, 97 are normally urged to move toward each other by a tension spring 102 acting between the arms 96, 97. The suckers 94, 95 are connected to a source of vacuum, such as a vacuum pump, (not shown) through a pair of fittings 100, 101.

The holder mechanism includes a sleeve holder 103 mounted by an inverted L-shaped lever 120 on a frame 117 mounted on the slide 116. The sleeve holder 103 has a pair of upper and lower rubber grips 104, 105 supported respectively on a pair of upper and lower supports 106, 107. The upper and lower supports 106, 107 are operatively coupled to a small-size cylinder actuator (not shown) housed in the sleeve holder 103. When the cylinder actuator in the sleeve holder 103 is actuated in response to operation of a cylinder actuator (later described), the supports 106, 107 are turned clockwise and counterclockwise, respectively, to displace the rubber grips 104, 105 away from each other for jointly gripping the rear end of the sleeve 93 therebetween.

A cylinder actuator 108 is supported by a connector 109 on an L-shaped lever 118 mounted on the frame 117. The cylinder actuator 108 has a piston rod to which is coupled a connector 109. An intermediate member 111 is fastened to the connector 109 and has a pin 110 slidably received in a vertical slot 112A in a guide 112 affixed to the upper pivotable arm 96. The pivotable arms 96, 97 have on rear ends thereof a pair of gears 113, 114, respectively, held in mesh with each other. When the cylinder 108 is actuated to pull its piston rod, the upper pivotable arm 96 is angularly moved upwardly, turning the gear 113 clockwise about its own axis. Then, the gear 114 meshing with the gear 113 is caused thereby to turn counterclockwise about its own axis, whereupon the lower pivotable arm 97 is angularly moved downwardly. Therefore, the suckers 94, 95 are now moved away from each other to spread the disc insertion slot 93A of the sleeve 93.

In FIG. 18, a disc rest 121 for receiving thereon a video disc includes a tapered projection 122 having a diameter which is slightly smaller than the central hole in the video disc, a vertical rod 123 on which the tapered projection 122 is supported, and a coupling 124 mounted on a lower end of the vertical rod 123. The disc rest 121 has therein a channel 121C and a pair of vacuum ports 121A, 121B opening upwardly and held in communication with the channel 121C. The channel 121C communicates through the vertical rod 123 with the coupling 124, which is connected to a vacuum pump via a tube (not shown).

Figure 19:
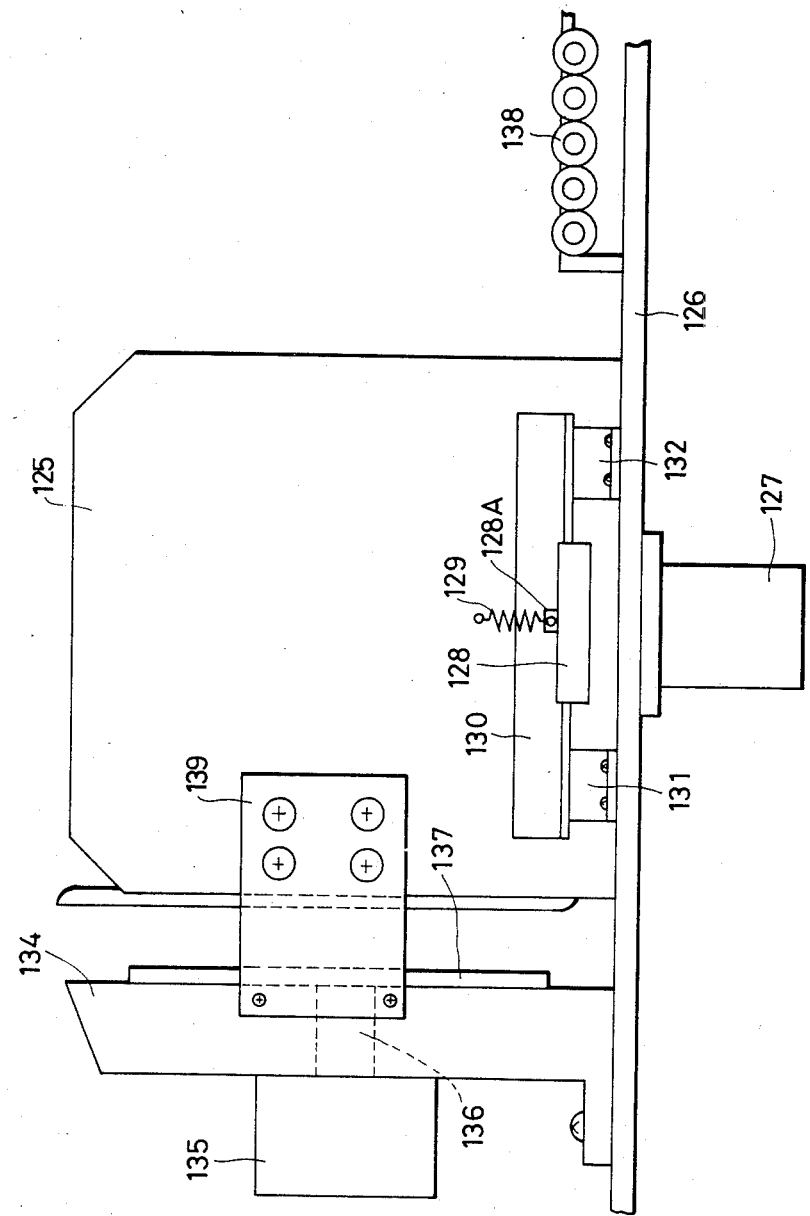
FIG. 19 is a side elevational view of a temporary stocker mechanism for stocking disc casings with video discs stored therein.
Figure 20:
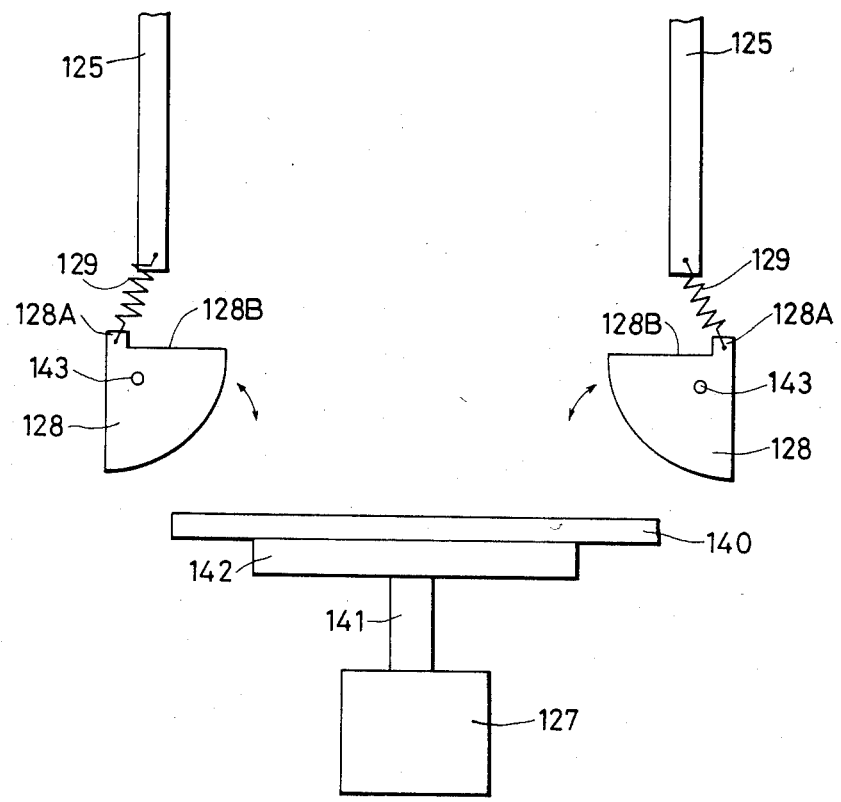
FIG. 20 is a fragmentary front elevational view of the temporary stocker mechanism shown in FIG. 19.

FIGS. 19 and 20 illustrate a temporary stocker mechanism for temporarily stocking disc casings with video discs stored therein. The temporaty stocker mechanism has a pair of vertical stacker plates 125, 125 spaced horizontally from each other and fixedly mounted on a frame 126. A cylinder actuator 127 is supported on and disposed below the frame 126 and has a piston rod 141 which supports a lifter table 142 on its upper end. When a disc casing is transferred by a belt conveyor to a position above the lifter table 142, a limit switch (not shown) is actuated by the disc casing thus conveyed to actuate the cylinder 127 for thereby raising the lifter table 142 to move one disc casing at a time upwardly. The disc casing thus lifted by the lifter table 142 is held by a pair of holder plates 128, 128 each in the shape of a quadrant. The holder plates 128, 128 are angularly movable about a pair of pins 143, 143, respectively, and are normally urged to turn one clockwise and the other counterclockwise respectively by a pair of springs 129, 129 each acting between one of the stacker plates 125, 125 and a corresponding one of the holder plates 128, 128. Each of the holder plates 128, 128 includes an upper flat surface 128B for supporting thereon a completed disc casing 140 (FIG. 20) with a video disc contained therein. Each of the holder plates 128 is pivotably supported on an attachment plate 130 mounted on the frame 126 by a pair of legs 131, 132.

An L-shaped frame 134 is mounted on the frame 126 and supports a cylinder actuator 135 having a piston rod 136 to which there is coupled a pusher plate 137. The L-shaped frame 134 is connected to the stacker plates 125, 125 by connector plates 139. When a predetermined number of disc casings 140 are deposited between the stacker plates 125, 125, a counter (not shown) issues a signal in response to which the cylinder actuator 135 is actuated to move the pusher plate 137 to push the disc casings 140 placed on the lifter table 142 out onto a discharge roller conveyor 138 (FIG. 19). Although in the illustrated embodiment the stacked disc casings 140 are pushed off the lifter table 142 slightly upwardly onto the discharge conveyor 138, the latter may be located at a position below the illustrated position so that the stacked disc casings 140 will drop off the lifter table 142 onto the belt conveyor 138. According to another modification, the disc casings 140 may be temporarily stored as they stand on their edges, rather than being stacked horizontally, and may be discharged in their vertical disposition onto the belt conveyor 138.

Operation of the apparatus thus constructed according to the present invention will now be described in detail with reference to FIGS. 2 and 6 through 20. First, the process of picking up and transferring a video disc will be described with reference to FIGS. 6 through 10. A pallet 2 supporting thereon a predetermined number of video discs that have been shaped to desired contour by a press machine is transferred on and along the disc pallet conveyor 3 in the direction of the arrow A (FIG. 6) until the pallet 2 abuts against the outlet stoppers 5, 5 (FIG. 8). Then, the limit switch 10 is actuated to operate the cylinder 8 to cause the connector head 7 to turn the positioning arm 6 counterclockwise into abutting engagement with the bevelled corner 11 of the pallet 2, thereby positioning the pallet 2 in place. At this time, an empty pallet 2' is transferred by the empty pallet conveyor 3 to a position which is in juxtaposed relation to the pallet 2. The empty pallet 2' may instead be moved to such a position in advance of transfer of the pallet 2 with the video discs carried thereon. When the pallets 2, 2' are thus positioned at their desired locations, a limit switch (not shown) is actuated to get the cylinder 32 in operation to cause its piston rod to lift the pusher base 34. The disc pushers 36, 36 are then moved upwardly through the holes 37, 37 to raise the stacked video discs D off the pallet 2 (FIG. 9). The empty pallet 2' is also raised by a suitable mechanism which is similar to the pushers 36, 36 up to a predetermined position. At this time, the slide 14 has been moved to the left (FIG. 9) with the sensors 21A, 21B on the plate 18 being positioned above the pallets 2', 2, respectively.

When the stack of video discs D is raised to a predetermined position, the cylinder 13 is actuated to lower the plate 13 so that the sensor 21B can determine whether there is any partition 20 on the stack of video discs D. If there is a partition 20 on the stack of video discs D, then a switch (not illustrated) is actuated to move the slide 14 to the right as shown in FIG. 9 until the electromagnet 25 on the plate 18 is positioned above the partition 20 on the stack of video discs D on the pallet 2. When the electromagnet 25 is positioned above the partition 20, a limit switch (not illustrated) is actuated to operate the cylinder 13 again to lower the plate 18 until the electromagnet 25 as energized attracts the partition 20 which is of magnetic material. When the partition 20 is picked up by the electromagnet 25, the cylinder 13 is actuated again to lift the plate 18. Then, a switch (not shown) is caused by such upward movement of the plate 18 to operate to return the slide 14 leftward (FIG. 9) until the partition 20 attracted by the electromagnet 25 is located over the empty pallet 2'. With the partition 25 thus positioned above the empty pallet 2', the electromagnet 25 is de-energized to allow the partition 20 to drop off the electromagnet 25 onto the pallet 2'. When one partition is placed on the pallet 2', the light beam from the light source associated with the empty pallet 2' is broken by such partition, causing the pallet 2' to descend a predetermined distance. The foregoing operation is repeated several times until a predetermined number of partitions 20 are placed on the pallet 2'. The pallet 2' is lowered each time a partition 20 is deposited thereon, and when the predetermined number of partitions 20 are put on the pallet 2', the pallet 2' is fully lowered to thereby actuate a switch (not shown), whereupon the outlet stoppers 5', 5' start moving downwardly. When the outlet stoppers 5', 5' are withdrawn downwardly, the pallet 2' is forced by the positioning arm (not shown, but similar to the positioning arm 6) to move leftward to a predetermined position in which the partitions 20 are retrieved.

When the electromagnet 25 is located above the pallet 2', an uppermost one of the video discs D on the pallet 2 is picked up by the suckers 22, 23. Upon subsequent rightward movement of the slide 14, the video disc D attracted by the suckers 22, 23 is also moved to the left toward a storage position in which the video disc D is to be inserted into a disc casing. When all of the partitions 20 and video discs D are thus transferred from the pallet 2, the beam of light emitted from the light source associated with the pallet 2 is allowed to reach the corresponding photodetector, with the result that a limit switch (not shown) operates to lower the outlet stoppers 5, 5. Such downward withdrawal of the outlet stoppers 5, 5 permits the pallet 2 to be displaced by the positioning arm 6 of the inlet stopper 4 leftward (FIG. 8) to a position in which the pallet 2 that is now empty is retrieved.

As described above with reference to FIG. 10, each of the pickup devices 22, 23 which is in the form of bellows has a length of L in its free state, and is compressible axially to the length of l when the suckers 22A, 23A of the pickup devices 22, 23 are pressed against a video disc $D_1$. While the pickup devices 22, 23 are being thus compressed during which their length is reduced from L to l, a sufficient vacuum is developed in the pickup devices 22, 23 to pick up the video disc $D_1$ and separate the same from a lower video disc $D_2$. Thus, the video discs $D_1, D_2, \ldots D_n$ can reliably be picked up and transferred one by one by the pickup devices 22, 23.

The second process of determining the type of a disc casing and its upper or lower surface, and transferring such a disc casing to a storage position in which a video disc is stored into the disc casing, will now be described with reference to FIGS. 11 through 15. When the pallet 2 with the video discs D placed thereon arrives at the video disc transfer position, a limit switch (not illustrated) is actuated to get the cylinder 43 (FIG. 11) in operation. The actuation of the cylinder 43 pushes the piston rod 42 to move the flange 40 toward a disc casing 44 stocked in the stocker 45 until the sensor 38 engages in the slots in the disc casing 44 for detecting the kind of the disc casing 44. If the type of the disc casing 44 is a desired one, then the cylinder 43 is actuated again to retract the flange away from the disc casing 44. If on the other hand the disc casing 44 is of a different type which is not desired at the time, the cylinder 43 causes the flange 40 to remain held against the disc casing 44. Failure of the cylinder 43 to be actuated to pull the flange 40 off the disc casing 44 actuates a non-illustrated limit switch in order to actuate the small-size cylinder 57 (FIGS. 12 and 13) so that the piston rod 58 thereof will push the attachment 59. When the attachment 59 is thus pushed, the pusher fingers 54 are turned counterclockwise about the pins 60 and enter the movable frame 52, thereby preventing a disc casing 44 of an unwanted type from going to the storage position.

When the disc casing 44 is found to be of a desired type and the piston rod 42 is pulled into the cylinder 43, a limit switch (not shown) is actuated by the piston rod 42 to operate the cylinder 62, whereupon the casing pusher 46 starts to be displaced to the left as shown in FIGS. 12 and 13. At this time, the pusher fingers 54 mounted on the movable frame 52 engages an edge of a lowermost one of disc casings 44 stocked in the stocker 45 and pushes that disc casing 44 leftward to the storage position. Any completed disc casing with a video disc inserted therein which is located in such storage position is pushed off toward a discharge conveyor by the pusher fingers 56 mounted on the front end of the movable frame 52. After the pusher fingers 54, 56 have thus pushed off disc casings, a switch (not illustrated) disposed on one of the guide rails 61, 61 is turned on to actuate the cylinder 62 again to retract the casing pusher 46 rightward to the position shown by the solid lines in FIGS. 12 and 13. During such retracting movement, the slant edges 54A, 56A of the pusher fingers 54, 56 are slidably pushed down by the lower edges of the L-shaped frame members 50 and the side edges of a lowermost disc casing 44 against the resilient force of the springs 53, 55 so as to lie substantially flush with the upper edge of the movable frame 52, allowing the casing pusher 46 to return to the starting position easily and smoothly.

As shown in FIGS. 14 and 15, most of the disc casings above the lowermost one of the disc casings stocked in the stocker 45 are selectively supported and hence the lowermost casing is set substantially free from the weight otherwise exerted thereon by the stacked disc casings disposed above. When pressure in cylinder actuator 63 moves connector 65 upward, thus pulling the toggle arms upward at their ends pinned by pin 67 (FIGS. 14, 15), the outer ends of toggle arms 66 will be pulled inward and will pull rubber grippers in an upward direction. Rubber grippers 68 are mounted on paired rods 71 which are rather loosely supported in apertures 161 in bushings 160 (connected to uprights 48). The looseness of fit between rods 71 and the apertures 161 (most clearly seen in FIG. 15) allows the inside surfaces of rubber gribbers to move in sufficiently to compressively grasp most of the disc casings above the lowermost disc casing therebetween. The inherent resiliency of the rubber from which grippers 68 are made complements this functioning of toggle arms 66 actuated by fluid pressure in 63. Vice versa, when pin 67 is moved downward, more casings are released to fall therebetween. Therefore, the lowermost disc casing can smoothly be pushed off by the casing pusher 46 without suffering from frictional damages which would otherwise be caused by the stack of disc casings normally pressing down thereon. The casing pusher 46 thus can push the lowermost disc casing out of the stocker 45 with a relatively small force.

The process of separating a disc casing into a lid plate and a sleeve, inserting a video disc into the sleeve, and then connecting the lid plate to the sleeve again will be described with reference to FIGS. 16 through 18. When the disc casing 44 is transferred to the storage position by the pusher fingers 54 of the casing pusher 46, the switch (not shown) on the guide rail 61 is actuated to get the cylinder 108 in operation. Operation of the cylinder 108 moves the intermediate member 111 downwardly (FIG. 18) to disengage the pin 110 from the upper end of the slot 112A. The pivotable arms 96, 97 are now allowed to move toward each other under the resiliency of the the spring 102 for thereby bringing the suckers 94, 95 on the arms 96, 97 into contact with the upper and lower surfaces of the sleeve 93 of the disc casing 44 adjacent to its disc insertion slot 93A. Upon contact of the suckers 94, 95 with the sleeve 93, a vacuum is introduced by the non-illustrated vacuum pump into the suckers 94, 95 through the fittings 100, 101, respectively. The upper and lower surfaces of the sleeve 93 are now attracted to the suckers 94, 95, spreading the slot 93A for easy insertion of a video disc therethrough into the sleeve 93. At this time, the cylinder 108 is actuated again to pull the arm 96 upwardly, whereupon the arm 97 is angularly moved downwardly by the gear 114 held in mesh with the gear 113.

Simultaneously with the operation of the cylinder 108, the cylinder (not shown) in the sleeve holder 103 is actuated to turn the rubber grips 104, 105 clockwise and counterclockwise, respectively, for sandwiching the rear end of the sleeve 93.

When the slot 93A is spread, the lid plate 92 contained in the sleeve 93 is ready for being removed therefrom, and a non-illustrated limit switch is actuated to move the lid plate remover 73 to the right as shown in FIGS. 16 and 17. As the plate 88 of the lid plate remover 73 is thus displaced, the tapered ends 81A, 82A of the presser arms 81, 82, respectively, are brought into pressing engagement with the lock arms 77, 78, respectively, of the lid plate 72 and displace the lock arms 77, 78 inwardly toward each other for disengaging the lock arms 77, 78 from the sleeve 93. At the same time, the movement of the plate 88 toward the sleeve 93 pushes the hook arms 79, 80 into the recesses 75, 76, respectively, whereupon a limit switch (not shown) is actuated to operate the cylinder 89 mounted on the plate 88. Actuation of the cylinder 89 causes the distal end 90A of the connector rod 90 to turn the hook arm 80 counterclockwise about the pin 84 until the locking projection 79A is locked into the cavity 76B in the recess 76 in the lid plate 72. The hook arm 79 is caused by the connector bar 85 coupled with the hook arm 80 to turn clockwise about the pin 83 against the bias of the spring 87, whereupon the locking projection 79A on the hook arm 79 is lockingly inserted in the cavity 75B in the recess 75 in the lid plate 72. Thus, the hook arms 79, 80 of the lid plate remover 73 are held in locking engagement with the lid plate 72. Then, a limit switch (not shown) is activated to retract the lid plate remover 73 away from the sleeve 93, that is, from the two-dot-and-dash-line position to the solid-line position as shown in FIG. 17.

When the lid plate remover 73 is stopped in the solid-line position of FIG. 17, a non-illustrated cylinder actuator is actuated in response to activation of a limit switch (not shown) to move the slide 116 (FIG. 18), which supports the cylinder 108, the arms 96, 97, and the sleeve 93, along the rails 115 to the right (FIG. 18) beyond the solid-line position to the position shown in FIG. 17. When a limit switch (not shown) mounted on one of the guide rails 115 is actuated by such rightward movement of the slide 16, the disc rest 121 is raised by the cylinder 124 to a predetermined position, which corresponds to the storage position that the casing holder mechanism has been shifted clear of. Concurrent with this operation, the slide 13 (FIGS. 7 and 9) which carries a video disc D on the suckers 22, 23 is moved in response to a signal from the limit switch on one of the guide rails 115 toward the position of FIG. 9, in which the disc rest 121 is located.

When the slide 14 is moved to the position over the disc rest 121, a switch (not illustrated) is activated to lift the disc rest 121 up to a position in which the video disc D as placed on the disc rest 121 is in horizontal alignment with the slot 93A, as spread, of the sleeve 93. With the disc rest 121 thus raised, a limit switch is actuated to operate the cylinder 13 to lower the plate 18. Upon arrival of the plate 18 at a predetermined lower position, the suckers 22, 23 on the plate 18 are deactivated to release the video disc D, when the latter D is placed onto an upper flat surface of the disc rest 121. At the same time that the suckers 22, 23 are deactivated, a vacuum is developed in the channel 121C and hence the vacuum ports 121A, 121B. The tapered projection 122 on the disc rest 121 allows the video disc D to be placed properly on the disc rest 121 as the tapered projection 122 enters and guides the central hole in the video disc D into coaxial alignment with the disc rest 121 even if the video disc D has dropped off-center with respect to the disc rest 121. When the video disc D falls onto the disc rest 121, the video disc D is securely attached to the the disc rest 121 under suction due to the vacuum acting on the video disc D through the vacuum ports 121A, 121B.

When the video disc D is thus retained on the disc rest 121, a switch (not shown) is actuated to move the lid plate remover 73 that carries the lid plate 72 to the right (FIG. 16) until an arcuate edge of the lid plate 72 abuts against a peripheral edge of the video disc D on the disc rest 121, whereupon the lid plate remover 73 stops its movement. In response to the stoppage of the lid plate remover 73, a limit switch (not shown) is turned on to actuate the cylinder to move back the slide 116 to the left (FIG. 18) from the position shown in FIG. 7. While the slide 116 is moving leftward as shown in FIG. 18, the video disc D supported on the disc rest 121 is inserted to a certain extent through the slot 93A into the sleeve 93 which is supported on the arms 96, 97 and the holder 103 on the slide 116. As the disc rest 121 enters the sleeve 93 to such an extent, a non-illustrated switch is actuated by an end of the slide 116 to allow the disc rest 121 to descend to the initial lower position out of engagement with the video disc D and the path of horizontal movement of the parts supported on the slide 116. Then, the slide 116 advances further to the left as shown in FIG. 18 until the video disc D is fully inserted into the sleeve 93. The slide 116 continues to advance to move the sleeve 93 with the video disc D stored therein for a distance needed for the lid plate 72 to fit into the sleeve 93. When the lid plate 72 fully enters the sleeve 93, the cylinder 89 of the lid plate remover 73 is deactivated to cause the hook arms 79, 80 to turn counterclockwise and clockwise, respectively, for disengaging the locking projections 79A, 80A out of the cavities 75B, 76B, respectively. Thereafter, a switch (not shown) is actuated to withdraw the lid plate remover 73 to the left as shown in FIG. 16 away from the completed disc casing.

The withdrawal of the lid plate remover 73 allows the lock arms 77, 78 to be pressed against the sleeve 93, whereupon the lid plate 72 is securely retained in the sleeve 93.

After the lid plate 72 has fully been fitted in the sleeve 72 thereby completing the disc casing with the video disc D contained therein, a next disc casing 44 which has been determined by the sensor 38 (FIG. 11) as being proper is delivered by the casing pusher 46 toward the holder mechanism as shown in FIG. 18. At this time, the completed disc casing 140 is pushed off by such a new disc casing 44 as delivered toward the discharge conveyor, by which the disc casing 140 is transferred onto the lifter table 142 coupled to the cylinder 127 of the temporary stocker machanism as illustrated in FIGS. 19 and 20.

The final process of stocking the completed disc casing 140 in the temporaty stocker mechanism and discharging the disc casing 140 from the temporary stocker mechanism will be described with reference to FIGS. 19 and 20. When the completed disc casing 140 is placed on the lifter table 142, a limit switch (not shown) is activated to actuate the cylinder 127 to extend the piston rod 141 for raising the disc casing 140. On the upward movement of the disc casing 140, the latter engages the arcuate edges of the holder plates 128 and turns the latter about the pins 143 against the force of the springs 129 as the disc casing 140 gets past the holder plates 128. When the disc casing 140 moves upwardly beyond the holder plates 128, the latter are angularly moved back under the bias of the springs 129 and their upper support surfaces 128B lie horizontally. The piston rod 141 of the cylinder 127 is now lowered to allow the lifted disc casing 140 to be deposited on the upper support surfaces 128B of the holder plates 128.

Successive disc casings 140 which have been completed by the foregoing processes are supplied in the above manner into the temporaty stocker mechanism. When a predetermined number of such completed disc casings 140 are deposited between the stacker plates 125, a counter (not shown) issues a signal to activate the cylinder 135, which then causes the pusher plate 137 to move forward and discharge the deposited disc casings 140 out of the temporary stocker mechanism onto the discharge conveyor 138.

With the apparatus according to the present invention, therefore, information storage mediums such as video discs can successively and safely be inserted into disc casings automatically at an increased rate of production.

Although a certain preferred embodiment of the present invention has been shown and described in detail, it should be understood that many changes and modifications may be made therein without departing from the scope of the appended claims.

For example, as shown in FIG. 3, the apparatus of the invention can be modified to perform a process comprising the steps of transferring a disc casing 44 to a separating position, separating the disc casing 44 at the separating position into a lid plate 72 and a sleeve 93, transferring again the lid plate 72 and the sleeve 93, feeding a video disc D to a storage position, reassembling the lid plate 72 and the sleeve 93 while storing the video disc D in the sleeve 93, and then discharging the completed disc casing 140 with the video disc D stored therein. As an alternative, a process effected by the apparatus of the invention may comprise, as shown in FIG. 4, the steps of transferring a lower sleeve member 93B to a storage position, supplying a video disc D from a stack of video discs on a pallet 2 into the lower sleeve member 93B, covering the the lower sleeve member 93B with an upper sleeve member 93A to enclose the video disc D in a completed sleeve 93, inserting a lid plate 72 into the sleeve 93, and then discharging the completed disc casing 140. According to still another modification as shown in FIG. 5, the apparatus of the invention may perform a process which comprises the step of transferring a video disc D from a stack on a pallet 2 to a storage position, moving a sleeve 93 toward the video disc D until the latter is fully stored in the sleeve 93, feeding the sleeve 93 with the video disc D inserted to a position in which a lid plate 72 is fitted into the sleeve 93 to thereby complete a disc casing 140 that stores the video disc D, and then discharging such a completed disc casing 140.

Although a certain preferred embodiment has been shown and described in detail, it should be understood that many changes and modifications may be made therein without departing from the scope of the appended claims.

What is claimed is:

1. An apparatus for storing information storage discs in casings, comprising:
   (a) first means for picking up and transferring an information storage disc to a storage position;
   (b) second means for stocking and transferring a casing composed of a sleeve and a removable lid plate inserted therein to said storage position;
   (c) third means for holding said casing in said storage position, said third means comprising a casing holder mechanism for holding said casing as fed to said storage position, a lid plate remover for removing said lid plate from said sleeve as supported by said casing holder mechanism, said lid plate remover comprising a remover plate, engagement means mounted on said remover plate for lockingly engaging said lid plate and actuating means for actuating said engagement means, and pulling means for pulling said lid plate engaged to said engagement means out of said sleeve;
   (d) means for moving said first and third means relative to each other for inserting said information storage disc into said sleeve in said storage position with said lid plate removed from said sleeve by said lid plate remover means;
   (e) means for moving said casing holder mechanism with respect to said lid plate remover for inserting said lid plate into said sleeve to provide a completed assembly of said casing and said information storage disc contained therein; and
   (f) fourth means for stocking and discharging said completed assembly.

2. An apparatus according to claim 1, wherein said first means comprises a conveyor for feeding a pallet supporting a stack of information storage mediums, a lifter device disposed below said conveyor and engageable with the bottom of said stack through said pallet for lifting said information storage mediums from said pallet, a first guide rail extending in transverse relation to said conveyor, a first slide movable along said first guide rail, a pickup device supported on said first slide and moveable therewith from a first position above said pallet in which said pickup device picks up said information storage medium from said pallet and moves said information storage medium toward said storage position.

3. An apparatus according to claim 2, wherein said lifter device includes a first fluid cylinder having a piston rod, and a pair of lifter rods connected to said piston rod and movable in response to actuation of said first fluid cylinder through holes in the pallet, said pickup device comprising at least one sucker for picking up said information medium under vacuum.

4. An apparatus according to claim 3, wherein said sucker comprises bellows for developing a vacuum therein, said bellows being compressible and extensible longitudinally.

5. An apparatus according to claim 2, wherein said first means further comprises a plate supported on said slide, said pickup device being mounted on said plate, and a second fluid cylinder mounted on said slide and operatively connected to said plate for moving said pickup device toward and away from the stack of information storage mediums placed on the pallet.

6. An apparatus according to claim 2, wherein said conveyor has a first stopper for stopping the pallet in said first position, and a second stopper for retaining said pallet in said first position.

7. An apparatus according to claim 1, wherein said second means comprises a stocker for stocking a stack of casings, and a casing pusher for pushing one of the casings at a time from said stocker to said storage position.

8. An apparatus according to claim 7, wherein said stocker is composed of a plurality of frame members which jointly constitute a hollow frame having an open lower end, said casing pusher comprising a guide rail, a movable frame movable along said guide rail, a fluid cylinder operatively connected to said movable frame for moving the latter along said guide rail, and a pusher finger mounted on said movable frame for engaging said one of the casings at said open lower end and pushing said one casing out of said hollow frame toward said storage position.

9. An apparatus according to claim 7, wherein said casing pusher further includes a spring acting between said pusher finger and said movable frame for normally urging said pusher finger toward said hollow frame, said pusher finger having a slanted edge resiliently engageable with said hollow frame when said casing pusher is retracted away from said storage position.

10. An apparatus according to claim 7, wherein said stocker includes means for dropping said one casing from said stack of casings to release said one casing of a load imposed by the weight of said stack of casings thereabove.

11. An apparatus according to claim 10, wherein said means comprises a fluid cylinder having a piston rod, a pair of toggle arms operatively connected to said piston rod, and at least a pair of rubber grippers for supporting therebetween said stack of casing, said rubber grippers being movable away from each other in response to actuation of said fluid cylinder for allowing said one casing to fall off said rubber grippers.

12. An apparatus according to claim 1, wherein said casing holder mechanism includes a pair of pivotable arms angularly movable toward and away from each other, a pair of suckers mounted on said pivotable arms, respectively, for engaging said casing disposed therebetween, a guide rail, a slide supporting said pivotable arms and movable along said guide rail to displace said pivotable arms between said storage position and a position remote therefrom, a third fluid cylinder supported on said slide and operatively connected to one of said pivotable arms, a sleeve holder supported by said slide and positioned between said pivotable arms remotely from said suckers for holding said sleeve at an end thereof, and a pair of gears mounted respectively on said pivotable arms remotely from said suckers and held in mesh with each other for regularly moving said pivotable arms toward and away from each other in response to actuation of said third fluid cylinder.

13. An apparatus according to claim 12, wherein said suckers are actuated under vacuum developed therein for attracting upper and lower surfaces of said sleeve to open an insertion slot therein remote from said end, said sleeve holder including a pair of upper and lower rubber grips for sandwiching said end of said sleeve therebetween in engagement with said upper and lower surfaces, respectively, of said sleeve.

14. An apparatus according to claim 13, wherein said third means further includes a rest for supporting the information storage disc in said storage position when said said pivotable arms are moved to said position remote from said storage position, said rest having a tapered projection for insertion into a hole in the information storage disc and a channel for developing therein a vacuum to attract the information storage disc as supported on said rest.

15. An apparatus according to claim 14, wherein said slide is movable along said guide rail to displace said pivotable arms from said remote position to said storage position for allowing the information storage disc supported on said rest to be inserted into said sleeve through said insertion slot.

16. An apparatus according to claim 1, wherein said engagement means comprises a pair of hook arms pivotably mounted on said remover plate and angularly movable for locking engagement with said lid plate, and said actuating means comprises a fourth fluid cylinder mounted on said remover plate and operatively connected to said hook arms for actuating said hook arms into locking engagement with said lid plate.

17. An apparatus according to claim 16, wherein said lid plate remover further comprises a connector bar operatively connected to said hook arms for causing the latter to move away from each other for locking engagement with said lid plate and toward each other for unlocking said lid plate in response to actuation of said fourth fluid cylinder.

18. An apparatus according to claim 16, wherein said remover plate includes pair of presser arms engageable with said lid plate on its edges for assisting said lid plate in disengaging from the said sleeve.

19. An apparatus according to claim 1, wherein said fourth means comprises a pair of stacker plates defining therebetween a stocking space for accommodating completed assemblies, a fifth fluid cylinder, a lifter table operatively connected to said fifth fluid cylinder for lifting one of said completed assemblies at a time into said stocking space, and a pair of pivotably movable holder plates spaced from each other and having a pair of holder surfaces, respectively normally resiliently urged to project into said stocking space, said lifter table with said completed assembly supported thereon being movable into said stocking space in response to actuation of said fluid cylinder, whereby said completed assembly can be retained on said holder surface when said lifter table is retracted out of said stocking space by said fifth fluid cylinder.

20. An apparatus according to claim 19, wherein said fourth means further includes a discharge conveyor, a sixth fluid cylinder and a pusher plate actuatable thereby for pushing a predetermined number of completed assemblies out of said stocking space onto said discharge conveyor.

* * * * *